United States Patent
Lertrattanapanich et al.

(10) Patent No.: US 7,620,263 B2
(45) Date of Patent: Nov. 17, 2009

(54) ANTI-CLIPPING METHOD FOR IMAGE SHARPNESS ENHANCEMENT

(75) Inventors: Surapong Lertrattanapanich, Santa Ana, CA (US); Yeong-Taeg Kim, Irvine, CA (US); Zhi Zhou, Corona, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 665 days.

(21) Appl. No.: 11/246,655

(22) Filed: Oct. 6, 2005

(65) Prior Publication Data
US 2007/0081737 A1  Apr. 12, 2007

(51) Int. Cl.
G06K 9/40  (2006.01)
G10L 19/02  (2006.01)
G10L 19/14  (2006.01)

(52) U.S. Cl. .............. 382/269; 382/254; 382/275; 704/203; 704/225; 704/234; 704/236

(58) Field of Classification Search ........... 382/254, 382/260, 261, 269, 275; 704/203, 225, 234, 704/236
See application file for complete search history.

(56) References Cited

U.S. PATENT DOCUMENTS

| | | | | |
|---|---|---|---|---|
| 5,068,909 A * | 11/1991 | Rutherford et al. | ........... | 382/302 |
| 5,666,443 A * | 9/1997 | Kumashiro | ................. | 382/266 |
| 5,717,789 A * | 2/1998 | Anderson et al. | ........... | 382/254 |
| 5,880,767 A * | 3/1999 | Liu | ............................ | 347/251 |
| 5,966,506 A * | 10/1999 | Morton | ........................ | 358/1.9 |
| 6,005,983 A * | 12/1999 | Anderson et al. | ........... | 382/254 |
| 6,035,060 A * | 3/2000 | Chen et al. | ................... | 382/164 |
| 6,072,538 A * | 6/2000 | Keating | ...................... | 348/625 |
| 6,148,116 A * | 11/2000 | Park et al. | .................... | 382/266 |
| 6,377,637 B1 * | 4/2002 | Berdugo | ..................... | 375/346 |
| 6,600,518 B1 * | 7/2003 | Bakhmutsky et al. | ....... | 348/625 |
| 6,898,325 B2 * | 5/2005 | Gormish | ..................... | 382/248 |
| 7,009,662 B2 * | 3/2006 | Ojo et al. | ..................... | 348/625 |
| 7,319,787 B2 * | 1/2008 | Trifonov et al. | ............. | 382/168 |
| 2002/0047933 A1 * | 4/2002 | Vlahos et al. | ............... | 348/627 |
| 2006/0104476 A1 * | 5/2006 | Chen | .......................... | 382/100 |

OTHER PUBLICATIONS

Seto, Takamasa et al., "Selective Sharpness Enhancement of Heavily—Corrupted Old Film Sequences",2000, Image Processing, 2000 Proceedings. 2000 Internation Conference on,vol. 2, pp. 676-679.*

Egbert, Jaspers et al., "A Generic 2D Sharpness Enhancement Algorithm for Luminance Signals", Jul. 14-17 1997, Image Processing and Its Applications, 1997., Sixth International Conference, vol. 1 pp. 269-273.*

* cited by examiner

Primary Examiner—Bhavesh M Mehta
Assistant Examiner—Gandhi Thirugnanam
(74) Attorney, Agent, or Firm—Kenneth L. Sherman, Esq.; Michael Zarrabian, Esq.; Myers Andras Sherman LLP

(57) ABSTRACT

An image processing system provides image enhancement and anti-clipping units. The anti-clipping unit for image sharpness enhancement, operates such that any shoot artifacts in the enhanced image that go beyond pixel value lower/upper bounds are properly adjusted back within the lower and upper bounds, without causing prominent edge jaggedness artifacts in the final resulting output image.

24 Claims, 4 Drawing Sheets

400

400

400

400

400

ANTI-CLIPPING METHOD FOR IMAGE SHARPNESS ENHANCEMENT

FIELD OF THE INVENTION

The present invention relates to digital image processing, and more particularly to the method of anti-clipping for image sharpness enhancement.

BACKGROUND OF THE INVENTION

In digital image processing, each pixel value in a digital image is represented by a set of finite integer numbers and bounded by two integer numbers called the "lower bound" and "upper bound". The pixel value represents the grayscale level or the brightness of a pixel which is bounded within the lower bound and upper bound. The lower bound usually is chosen to be 0 (black color in grayscale level) and the corresponding upper bound equals $2^n-1$ (white color in grayscale level), where n is the number of bits (binary numbers) used for representing the grayscale level (e.g., in 8-bit grayscale image, lower bound=0 and upper bound=$2^8-1=256-1=255$). For example, in an 8-bit grayscale digital image, each pixel value belongs to the set of 256 integer numbers $\{0, 1, \ldots, 255\}$, wherein the lower and upper bounds are 0 and 255, respectively.

Typically, when image sharpness enhancement is applied to a digital input image, the resulting output image contains many shoot artifacts (e.g., overshoots, undershoots, etc.) around sharp transition areas such as strong edges in the input image. Those shoot artifacts can either remain within, or go beyond, the lower and upper bounds of the pixels in the image. Conventionally, the shoot artifacts that go beyond said lower and upper bounds, are clipped according to the lower bound L and upper bound U. Specifically, the shoot artifacts are set to L if they are less than L, and set to U if greater than U. However, by extensive experiment and testing, it has been observed that the conventional clipping method results in the jaggedness artifact along the strong edges and lines in the image.

BRIEF SUMMARY OF THE INVENTION

An object of the present invention is to improve on, and generalize, the conventional clipping method so that shoot artifacts in an enhanced image are properly adjusted back within pixel value lower and upper bounds, without causing prominent edge jaggedness artifacts in the final resulting output image.

In one embodiment the present invention provides an image processing system implementing an anti-clipping method for image sharpness enhancement. The anti-clipping method improves on and generalizes the conventional clipping method in such a way that shoot artifacts in the processed image that go beyond the pixel value lower/upper bounds are properly adjusted back within the lower and upper bounds, without causing prominent edge jaggedness artifacts in the final resulting output image.

In one embodiment the present invention provides and anti-clipping method and system for image sharpness enhancement. The steps of performing anti-clipping includes the steps of detecting signal values in the enhanced signals which are below a lower bound or are above an upper bound, and adjusting the detected signal values to be within the selected upper and lower bound, without introducing prominent unwanted artifacts in the output signal.

The steps of performing anti-clipping for a current enhanced signal value further includes the steps of generating an alpha coefficient as a function of the current enhanced signal value, the corresponding digital signal value, a lower bound and an upper bound, wherein the alpha coefficient represents the amount of adjustment for the current enhanced signal value. Each enhanced signal value has an associated alpha coefficient. The steps of performing anti-clipping for a current enhanced signal value further includes the steps of: filtering the alpha coefficient to generate a refined coefficient for the current enhanced signal value; subtracting the digital signal from the enhanced signal to generate a first signal; multiplying the refined coefficient to the first signal to generate a second signal; and adding the second signal to the digital signal to generate said output signal.

The present invention further provides an image processing system that implements the method of the present invention.

As such, in one aspect, the present invention provides an anti-clipping method and system for image sharpness enhancement, wherein any shoot artifacts in the processed (i.e., enhanced) image that go beyond pixel value lower/upper bounds are properly adjusted back within the lower and upper bounds, without causing prominent edge jaggedness artifacts in the final resulting output image.

Other features and advantages of the present invention will be apparent from the following specifications taken in conjunction with the following drawings.

DETAILED DESCRIPTION OF THE INVENTION

In one embodiment the present invention provides an image processing system implementing an anti-clipping method for image sharpness enhancement. The anti-clipping method improves on and generalizes the conventional clipping method in such a way that shoot artifacts in the processed image that go beyond the pixel value lower/upper bounds are properly adjusted back within the lower and upper bounds, without causing prominent edge jaggedness artifacts in the final resulting output image.

Figure 1:
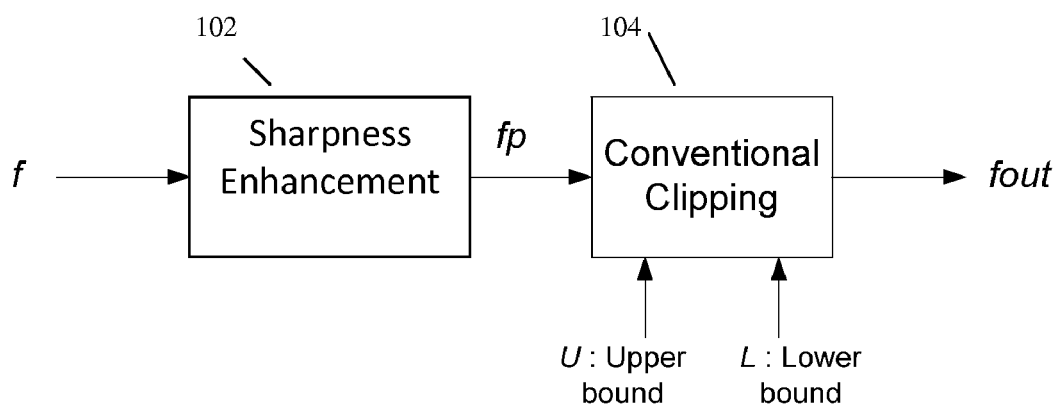
FIG. 1 shows a block diagram illustrating the application of image sharpness enhancement to an input image followed by a conventional clipping unit.

FIG. 1 illustrates a conventional system 100 implementing the application of an image sharpness enhancement unit 102 to the input image $f$ to generate the processed image $f_p$, followed by a clipping unit 104 based on the preset upper U and lower bounds L to generate the output image $f_{out}$. The clipping unit 104 may be a conventional clipping unit as known to those skilled in the art, used in this example.

Those skilled in the art will recognize, the sharpness enhancement unit 102 can implement any image sharpness enhancement algorithm that can boost up the energy in the high frequency component of the image, while leaving the low frequency components unchanged. An example of image sharpness enhancement algorithm is to apply the "high-boost spatial filter" represented by relation (1) below to the input image $f$:

$$h = \frac{1}{9}\begin{bmatrix} -1 & -1 & -1 \\ -1 & 17 & -1 \\ -1 & -1 & -1 \end{bmatrix} \quad (1)$$

Without loss of generality, the present invention assumes that the input image $f$ and processed image $f_p$ are available for conventional clipping, and as such the sharpness enhancement unit 102 is not discussed further.

The function of the clipping unit 104 is now described. Let M and N denote the numbers of rows and columns of both input and processed images $f$ and $f_p$, respectively. For the sake of brevity, the indices x and y are omitted in the FIG. 1. The current processed pixel value $f_p[x, y]$ at the row y and column x is clipped according to relation (2) below, wherein for y=0, 1, 2, ..., M and x=0, 1, 2, ..., N, the clipped result $f_{out}[x, y]$ can be expressed by:

$$f_{out}[x, y] = \begin{cases} L & \text{if } f_p[x, y] < L; \\ U & \text{if } f_p[x, y] > U; \\ f[x, y] & \text{otherwise.} \end{cases} \quad (2)$$

As noted, the lower bound L and the upper bound U are usually determined from the number of bits used in representing digital image. For an arbitrary n-bit digital image, the typical choices of L and U are 0 and $2^n-1$, respectively.

Figure 2:
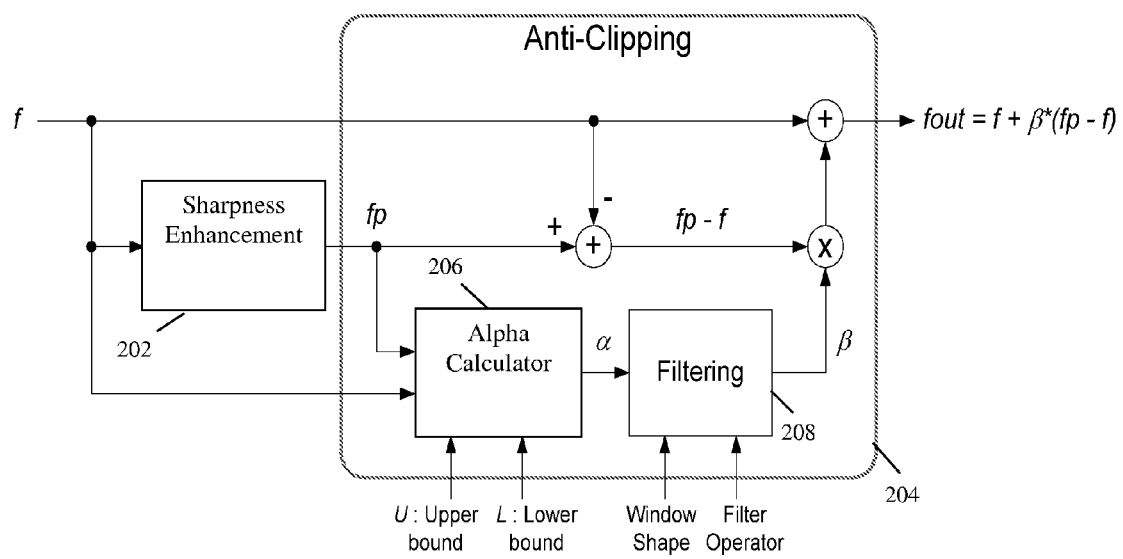
FIG. 2 shows a block diagram of an embodiment of an image processing system that performs an image sharpness enhancement process on the input image followed by an anti-clipping process, according to an embodiment of the present invention.

FIG. 2 illustrates a system 200 according to an embodiment of the present invention, implementing the application of an image sharpness enhancement unit 202 to the input image $f$ to generate the processed image $f_p$, followed by an anti-clipping unit 204 based on the preset upper U and lower bounds L to generate the output image $f_{out}$. The anti-clipping unit 204 includes two main modules: an alpha calculator 206 and a filtering unit 208.

The alpha calculator 206 is used to calculate an alpha coefficient α[x, y] from each pixel of input $f[x, y]$ and processed $f_p[x, y]$ images. Each enhanced signal value has an associated alpha coefficient. The alpha coefficient α[x,y] indicates the degree of adjustment to the current input pixel value, as described further below in relation to FIG. 3. The alpha coefficients are then filtered in the filtering unit 208 using a selected window of pixels around the current pixel.

For the filtering unit 208, one of the example window shapes in FIGS. 4(a)-(e) can be used in filtering. Each window 400 in the image shown in FIG. 4, includes at least the current pixel 402, and in FIGS. 4(b)-(e) surrounding pixels 404. Two filter operators e.g. {MIN, AVG} can be used in the filtering unit 208, wherein the MIN and AVG operators are, respectively, the minimum and average operators. In this example, choice between these two filters depends on the user input. The MIN operator is nonlinear while AVG is a linear operator.

An example filtering operation is now described. Using the window shape in FIG. 4(c) the refined coefficients β[x, y] based on the MIN operator are calculated by choosing the minimum value among the alpha coefficient α[x, y] for the current pixel 402 (indicated by the symbol x in FIG. 4(c)), and the alpha coefficients of its immediate four neighboring pixels 404 (i.e., alpha coefficients on the left α[x−1, y], on the right α[x+1, y], on the top α[x, y−1], and at the bottom α[x, y+1]), according to window shape, wherein:

$$\beta[x,y]=\min(\alpha[x,y],\alpha[x-1,y],\alpha[x+1,y],\alpha[x,y-1],\alpha[x,y+1]) \quad (3)$$

Figure 4A:
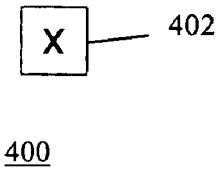
FIGS. 4(a)-(e) illustrate examples of window shapes which can be used in the filtering unit of FIG. 2.
Figure 4B:
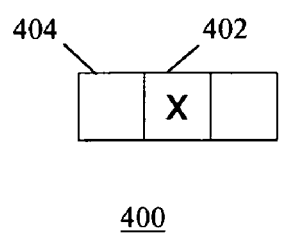
Figure 4C:
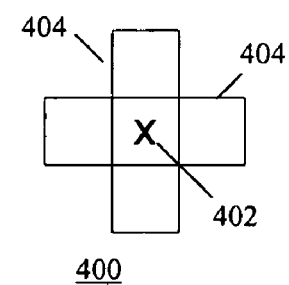
Figure 4D:
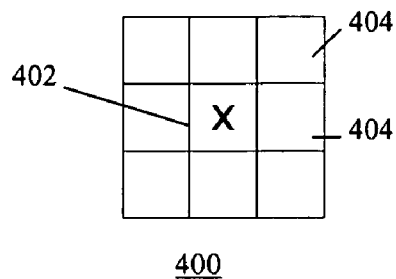
Figure 4E:
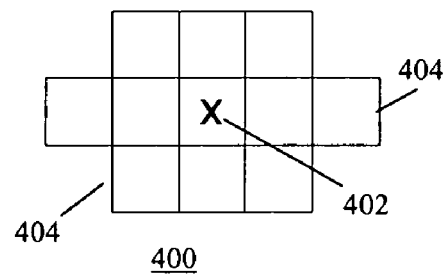

Selecting the window shape in FIG. 4(c) is only an example. Other window shapes can also be selected. Further, the MIN operator is an example filter operator used herein.

With the same example, the refined coefficient β[x, y] based on the AVG operator can be obtained as:

$$\beta[x, y] = \frac{1}{5}\left( \begin{array}{c} \alpha[x, y] + \alpha[x-1, y] + \alpha[x+1, y] + \\ \alpha[x, y-1] + \alpha[x, y+1] \end{array} \right) \quad (4)$$

According to the above example, the refined coefficient β[x, y] based on other selection of window shapes in FIGS. 4(a)-(e) can be calculated in the same fashion as those skilled in the art will recognize. Once a refined coefficient β[x, y] is calculated, it is multiplied with the difference $f_p[x, y]-f[x, y]$, and the result is added back to the original input pixel value $f[x, y]$ to obtain the final output pixel value $f_{out}[x, y]$, as:

$$f_{out}[x,y]=f[x,y]+\beta[x,y]\cdot(f_p[x,y]-f[x,y]) \quad (5)$$

The anti-clipping method is repeated until the last pixel of both the input image $f$ and the enhanced image $f_p$ are processed. It is noted that if the refined coefficient β[x, y] equals one, the final output pixel value $f_{out}[x, y]$ will equal the processed pixel value $f_p[x, y]$.

Figure 3:
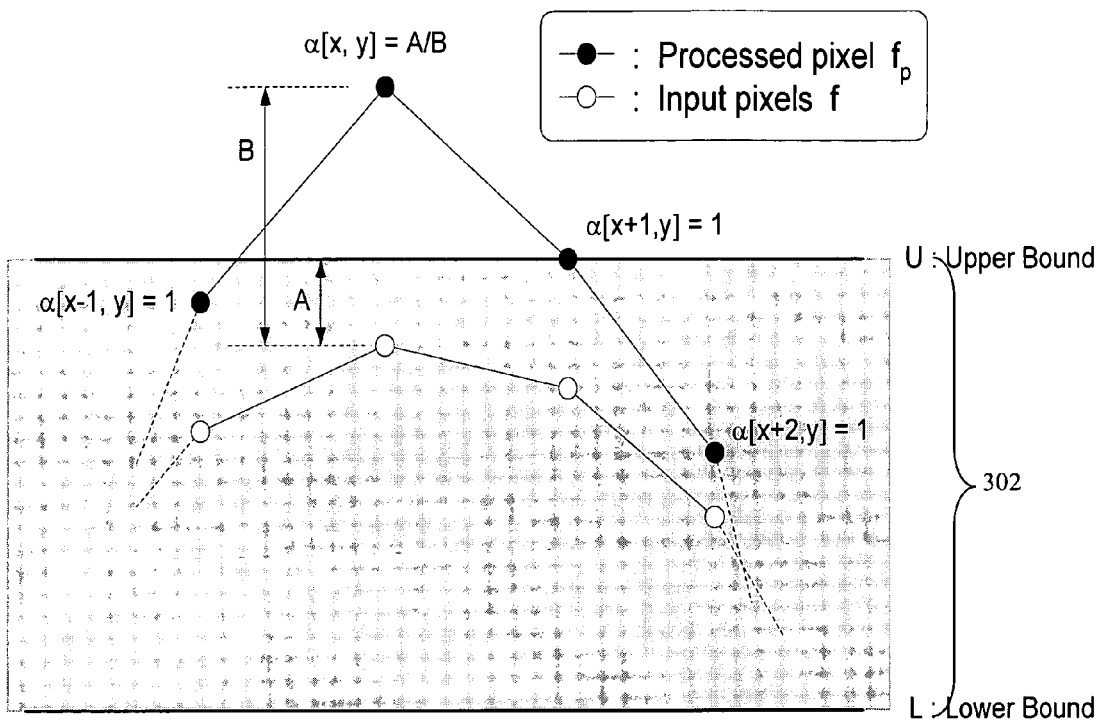
FIG. 3 shows an example graphical method of calculating the alpha coefficient in the alpha calculator of FIG. 2, according to an embodiment of the present invention.

FIG. 3 illustrates a graphical example of calculating the alpha coefficient by the alpha calculator 206. In FIG. 3, x and y denote the current pixel location in the image $f$, (i.e., y is the row number and x is the column number in the row y). In FIG. 3, the processed pixel and its corresponding input pixel are denoted by the filled circle (•) and hallow circle (°), respectively. The alpha coefficient α[x,y] associated with the current pixel value $f[x, y]$ is calculated according to relation (6) below showing three conditions:

$$\alpha[x, y] = \begin{cases} \dfrac{U - f[x, y]}{f_p[x, y] - f[x, y]} & \text{if } f_p[x, y] > U; \\ \dfrac{L - f[x, y]}{f_p[x, y] - f[x, y]} & \text{if } f_p[x, y] < L; \\ 1 & \text{otherwise.} \end{cases} \quad (6)$$

Accordingly, the alpha coefficient equals one if and only if the corresponding processed pixel value is within the close interval from L to U indicated by the area 302 in the FIG. 3; otherwise, the alpha coefficient is calculated according to the first two conditions in relation (6) above. It is worth noting that the alpha coefficient is bounded by 0 and 1 —i.e., $0 \leq \alpha \leq 1$. The first two conditions in relation (6) mean that the processed pixel $f_p[x, y]$ is either greater than the upper bound U (first condition) or less than the lower bound L (second condition).

In FIG. 3, four examples of calculating alpha coefficients are provided. As in this example the current processed pixel value $f_p[x, y]$ is greater than the upper bound U, the first (topmost) condition in relation (6) is satisfied, wherein the alpha coefficient α[x, y] is obtained by calculating A/B, where A=U−$f[x, y]$ and B=$f_p[x, y]$−$f[x, y]$. The other three alpha coefficients corresponding to the rest of pixels are equal to one because their processed pixel values are within the area 302 or the closed interval from L to U. The area 302 indicates the closed interval from L to U. Whenever the processed pixel falls within this area, the alpha coefficient is set to 1 according to relation (6).

As noted, FIGS. 4(a)-(e) show an example set of five different window shapes 400 that can be used in the filtering unit 208 in FIG. 2. The significant difference between the windows 400 in FIGS. 4(a)-(e) is related to their shapes as well as the number of neighbors surrounding the considered alpha coefficient. In FIGS. 4(a)-(e) the symbol x indicates the center of the window 400 and it is always associated with the alpha coefficient α[x, y] of the current pixel 402. By selecting the window shape in FIG. 4(a) and either MIN or AVG filter operator in the filtering unit 208, it is straightforward to verify that the resulting output is equivalent to the conventional clipping counterpart. The conventional clipping is only a special case of an embodiment of an anti-clipping according to the present invention when the window in 4(a) is selected. When the window in FIG. 4(a) is selected, the final resulting output is that of the conventional clipping method. This is useful in practice because as a result the anti-clipping method of the present invention can perform in different modes (depending on chosen window shapes and filter operators) wherein the conventional clipping result can be obtained simply by selecting a proper window shape (window in FIG. 4(a)).

As such, an anti-clipping method according to the present invention provides more flexibility in choosing other window shapes 400 such as in FIGS. 4(b)-(e) and filter operators {MIN, AVG} in order to make the final output bounded by the closed interval [L, U], while not causing the obvious edge jaggedness artifacts. In addition to the example window shapes 400 in FIGS. 4(a)-(e) other window shapes are also possible.

The example window shapes shown in FIGS. 4(a)-(e) are used in the filtering module 208. Different window shapes provide different setting of neighbors of considered alpha coefficient. The basic criterion of selecting window shapes is now described. The window shape in FIG. 4(a) is used when the conventional clipping result is needed. If the input signal is one-dimensional signal, such as audio signal, then the window shape in FIG. 4(b) can be used. However, this window has only two neighbors (on left and right of considered alpha coefficient). Other variations such as four or more neighbors can also be applied. If the input signal is two-dimensional signal, such as digital image, then window shapes in FIGS. 4(b)-(e) can be used. In one example simulation of anti-clipping for digital image sharpness enhancement, the inventors used the window shape in FIG. 4(c) as the default window shape.

An example anti-clipping method implementation for an input image f having a width N and height M (i.e., N×M pixels), according to an embodiment of the present invention, includes the steps of:

(a) for y=0, 1, . . . , N and x=0, 1, 2, . . . , M, based on the input image f[x, y], processed image $f_p$[x, y] and the preset lower bound L and upper bound U, calculate an alpha coefficient α[x, y] (usually the processing is performed for each row and then each column in the current row);

(b) based on the chosen window shape from the example window shape collection in FIGS. 4(a)-(e), and a chosen filter operator (MIN or AVG), perform filtering of the alpha coefficients to obtain a refined coefficient β[x, y];

(c) subtract the input pixel value f from the processed pixel value $f_p$ to obtain the difference pixel value $f_p$[x, y]−f[x, y];

(d) multiply the refined coefficient β[x, y] with the difference pixel value $f_p$[x, y]−71 [x, y];

(e) add the result of step (d) back to the original input pixel value to obtain final output pixel value $f_{out}$[x, y]; and (f) repeat steps (a) to (e) till the last pixel of the processed image.

As such, in one aspect, the present invention provides an anti-clipping method and system for image sharpness enhancement, wherein any shoot artifacts in the processed (i.e., enhanced) image that go beyond pixel value lower/upper bounds are properly adjusted back within the lower and upper bounds, without causing prominent edge jaggedness artifacts in the final resulting output image.

As those skilled in the art will recognize, an anti-clipping method according to the present invention is not only useful in digital image (two-dimensional) processing, but is also applicable to one-dimensional digital signal processing such as digital audio signals when proper window shapes are used. The window shapes which are applicable to one-dimensional digital signals are, for example, window shapes in FIGS. 4(a)-(b).

The present invention has been described in considerable detail with reference to certain preferred versions thereof; however, other versions are possible. For example, other window shapes are not limited to those shown in FIGS. 4(a)-(e), and other window shape variations can be utilized. Therefore, the spirit and scope of the appended claims should not be limited to the description of the preferred versions contained herein.

What is claimed is:

1. A signal processing method for enhancing a digital signal, comprising:
   enhancing pixels in the digital signal to generate an enhanced digital signal; and
   performing anti-clipping on the enhanced digital signal to generate an output signal, whereby one or more pixel values in the enhanced digital signal are adjusted to be within a selected lower and upper bounds, without introducing prominent unwanted artifacts in the output signal, wherein performing anti-clipping further includes:
      generating an alpha coefficient as a function of the current enhanced digital signal value, the corresponding digital signal value, a lower bound and an upper bound, wherein the alpha coefficient represents an amount of adjustment for the current enhanced digital signal value;
      filtering the alpha coefficient to generate a refined coefficient for the current enhanced digital signal value
      subtracting the digital signal from the enhanced digital signal to generate a first signal;
      multiplying the refined coefficient to the first signal to generate a second signal; and
      adding the second signal to the digital signal to generate said output signal;
   wherein the digital signal and the enhanced digital signal represent digital images.

2. The method of claim 1 wherein performing anti-clipping further includes:
   detecting signal pixel values in the enhanced digital signal which are below a lower bound or are above an upper bound; and
   adjusting the detected signal pixel values to be within the selected upper and lower bound, without introducing prominent unwanted artifacts in the output signal.

3. The method of claim 1 wherein performing anti-clipping for a current enhanced digital signal value further includes:
   generating an alpha coefficient for one or more enhanced digital signal values, using a selected window of pixels around the current enhanced digital signal value, wherein each enhanced digital signal value has an associated alpha coefficient; and applying filtering to the alpha coefficient of the current enhanced digital signal value and the alpha coefficients of said selected window of pixels around the current enhanced digital signal value, to generate a refined coefficient for the current enhanced signal value.

4. The method of claim 3 wherein filtering of the alpha coefficients of the current enhanced digital signal value and the alpha coefficients of the selected window of pixels is completed by an averaging filter.

5. The method of claim 3 wherein filtering of the alpha coefficients of the current enhanced digital signal value and the alpha coefficients of the selected window of pixels is completed by a minimum filter.

6. The method of claim 3 wherein performing anti-clipping for the current enhanced digital signal value further includes:
   subtracting said corresponding digital signal value from said enhanced signal value to generate a first signal;
   multiplying the refined coefficient to the first signal to generate a second signal; and
   adding the second signal to the digital signal to generate said output signal associated with said corresponding digital signal value.

7. The method of claim 1 wherein the digital signal represents a digital input image comprising multiple pixels, and the enhanced digital signal represents an enhanced image comprising multiple pixels corresponding to the pixels in the digital input image.

8. The method of claim 7 wherein generating the alpha coefficient α[x, y] for a current processed pixel includes determining:

$$\alpha[x, y] = \begin{cases} \dfrac{U - f[x, y]}{f_p[x, y] - f[x, y]} & \text{if } f_p[x, y] > U; \\ \dfrac{L - f[x, y]}{f_p[x, y] - f[x, y]} & \text{if } f_p[x, y] < L; \\ 1 & \text{otherwise,} \end{cases}$$

wherein $f$ represents the input image,
$f_p$ represents the enhanced image,
x and y denote the current pixel location in the input image $f$, where y is the row number and x is the column number in the row y,
such that alpha coefficient α[x, y] is associated with the current pixel value f[x, y] and the current enhanced pixel value $f_p$[x, y],
U represents a pixel value upper bound, and
L represents a pixel value lower bound.

9. A signal processing system for enhancing a digital signal, comprising:
   a processor configured to store a digital signal in a memory;
   a signal enhancer that enhances pixels of the digital signal to generate enhanced signal pixels; and
   an anti-clipping unit that performs anti-clipping on the enhanced signal pixels to generate an output signal, whereby one or more enhanced signal pixels the enhanced signal are adjusted to be within selected lower and upper bounds, without introducing prominent unwanted artifacts in the output signal, the anti-clipping unit including:
      an adjustment coefficient calculator that generates an alpha coefficient for a current signal pixel value as a function of the current enhanced signal pixel value, the corresponding digital signal pixel value, a lower bound and an upper bound, wherein the alpha coefficient represents the amount of adjustment for the current enhanced signal pixel value;
      a filter that filters the alpha coefficient to generate a refined coefficient for the current enhanced signal pixel value;
      a subtractor that subtracts the digital signal from the enhanced signal to generate a first signal;
      a multiplier that applies the refined coefficient to the first signal to generate a second signal; and
      an adder that adds the second signal to the digital signal to generate said output signal
   wherein the digital signal and the enhanced signal represent digital images.

10. The system of claim 9 wherein the anti-clipping unit further detects signal pixel values in the enhanced signal which are below a lower bound or are above an upper bound, and adjusts the detected signal pixel values to be within the selected upper and lower bound, without introducing prominent unwanted artifacts in the output signal.

11. The system of claim 9 wherein the adjustment coefficient calculator further generates an alpha coefficient for one or more enhanced signal pixels using a selected window of pixels around the current enhanced signal pixel, and the filter filters the alpha coefficient of the current enhanced signal pixel and the alpha coefficients of said selected window of pixels around the signal pixels, to generate a refined coefficient for the current enhanced signal pixel value.

12. The system of claim 11 wherein the filter is an averaging filter.

13. The system of claim 11 wherein the filter is a minimum filter.

14. The system of claim 11 wherein the anti-clipping unit further includes:
   a first combiner for multiplying the refined coefficient to the first signal to generate a second signal; and
   a second combiner for combining the second signal with the digital signal to generate said output signal associated with said corresponding digital signal value.

15. The system of claim 9 wherein the digital signal represents a digital input image comprising multiple pixels, and the enhanced digital signal represents an enhanced image comprising multiple pixels corresponding to the pixels in the digital input image.

16. The system of claim 15 wherein adjustment coefficient calculator generates the alpha coefficient α[x, y] for a current processed pixel by determining:

$$\alpha[x, y] = \begin{cases} \dfrac{U - f[x, y]}{f_p[x, y] - f[x, y]} & \text{if } f_p[x, y] > U; \\ \dfrac{L - f[x, y]}{f_p[x, y] - f[x, y]} & \text{if } f_p[x, y] < L; \\ 1 & \text{otherwise,} \end{cases}$$

wherein $f$ represents the input image,
$f_p$ represents the enhanced image,
x and y denote the current pixel location in the input image $f$, where y is the row number and x is the column number in the row y,
such that alpha coefficient α[x, y] is associated with the current pixel value F[x, y] and the current enhanced pixel value $f_p$[x, y],
U represents a pixel value upper bound, and
L represents a pixel value lower bound.

17. An image processor for processing an enhanced digital image signal corresponding to an input digital signal, comprising:
  an anti-clipping unit that performs anti-clipping on the input digital signal to generate an enhanced output signal, whereby one or more enhanced signal pixels in the enhanced output signal are adjusted to be within selected lower and upper bounds, without introducing prominent unwanted artifacts in the enhanced output signal, the anti-clipping unit comprising:
    an adjustment coefficient calculator that generates an alpha coefficient for a current signal pixel value as a function of a current enhanced signal pixel value, the corresponding digital signal pixel value, a lower bound and an upper bound, wherein the alpha coefficient represents an amount of adjustment for the current enhanced signal pixel value;
    a filter that filters the alpha coefficient to generate a refined coefficient for the current enhanced signal pixel value;
    a subtractor that subtracts the digital signal from the enhanced signal to generate a first signal;
    a multiplier that applies the refined coefficient to the first signal to generate a second signal; and
    an adder that adds the second signal to the digital signal to generate said output signal.

18. The image processor of claim 17 wherein the anti-clipping unit further detects signal pixel values in the enhanced signals which are below a lower bound or are above an upper bound, and adjusts the detected signal pixel values to be within the selected upper and lower bound, without introducing prominent unwanted artifacts in the output signal.

19. The image processor of claim 17 wherein the adjustment coefficient for one or more enhanced signal pixels using a selected window of pixels around the current enhanced signal pixel, and the filter filters the alpha coefficient of the current enhanced signal pixel value and the alpha coefficients of said selected window of pixels around the signal pixels, to generate a refined coefficient for the current enhanced signal value.

20. The image processor of claim 19 wherein the filter is an averaging filter.

21. The image processor of claim 19 wherein the filter is a minimum filter.

22. The image processor of claim 19 wherein the anti-clipping unit further includes:
  a first combiner for applying the refined coefficient to the first signal to generate a second signal; and
  a second combiner for combining the second signal with the digital signal to generate said output signal associated with said corresponding digital signal pixel value.

23. The image processor of claim 17 wherein the digital signal represents a digital input image comprising multiple pixels, and the enhanced digital signal represents an enhanced image comprising multiple pixels corresponding to the pixels in the digital input image.

24. The image processor of claim 23 wherein adjustment coefficient calculator generates the alpha coefficient $\alpha[x, y]$ for a current processed pixel by determining:

$$\alpha[x, y] = \begin{cases} \dfrac{U - f[x, y]}{f_p[x, y] - f[x, y]} & \text{if } f_p[x, y] > U; \\ \dfrac{L - f[x, y]}{f_p[x, y] - f[x, y]} & \text{if } f_p[x, y] < L; \\ 1 & \text{otherwise,} \end{cases}$$

wherein $f$ represents the input image,
$f_p$ represents the enhanced image,
x and y denote the current pixel location in the input image $f$, where y is the row number and x is the column number in the row y,
such that alpha coefficient $\alpha[x, y]$ is associated with the current pixel value $f[x, y]$ and the current enhanced pixel value $f_p[x, y]$,
U represents a pixel value upper bound, and
L represents a pixel value lower bound.

* * * * *